Patented Oct. 12, 1943

UNITED STATES PATENT OFFICE 2,331,356

COLORED SURFACE COATED GLAZED GRANULES, USEFUL AS ROOFING GRANULES, AND PROCESS OF MAKING THE SAME

George W. Swenson, St. Paul, Minn., assignor to Minnesota Mining & Manufacturing Company, St. Paul, Minn., a corporation of Delaware No Drawing. Application December 19, 1932, Serial No. 647,966

37 Claims. (Cl. 117—100)

This invention relates to improved process for treating mineral substances and to the resultant product and more particularly relates to the manufacture of glazed granules, more especially of the type covered with a glaze containing a coloring matter, and, while the invention is directed particularly to the treatment of naturally refractory materials with a colored glaze or the like, and the article per se, as well as a roofing material made with this article, it will be understood that the invention possesses a wide field of utility and may be adapted for analogous purposes.

The product of this invention may be incorporated as a coating for a roofing shingle or as an aggregate for incorporation in artificial stone such as cast stone and the like, and for the base granule there may be employed natural or artificial refractory substances such, for example, as smoky quartz, or cairngorm stone, sand, stone, slate, quartz, quartzite, limpid quartz crystal as the natural refractory substances, or crushed brick and other baked clay and similar material, porcelain, terra cotta or other ceramic wastes or cement compositions.

The finished product, that is to say, the natural or artificial refractory material with a glazed coating may be incorporated as a weather coating in a bituminously coated sheet for forming roofing material either in rolls or in shingles, or may be incorporated in cast stone.

It is well recognized that many industries employing granular materials are handicapped in the use of colored granules, inasmuch as the existing available material, such as naturally occurring colored rock, does not give either a wide range of colors, nor are the colors of an attractive or permanent nature.

Heretofore efforts have been made to treat crushed mineral material with a color bound to the granule with an organic bond and this is unsuited for many uses, inasmuch as the colors are only relatively permanent, and the organic bond does not have the life or ageing characteristics, particularly where it is desired to use the granules in permanent materials such as cast stone and the like. Furthermore, in the case of cast stone, the organic bond on the granules prevents permanent adhesion between the granule and the matrix of the cast stone.

As an alternative, inorganic bonds have been experimented with and chief among those known to me are the type employing a sodium silicate as the base. In these methods and in the articles resulting therefrom the colors are contained in a sodium silicate colloidal dispersion, and the granules are then coated with this mixture. The coated granules are then fired to fix the color and the silicate bond to the granule. However, there are many defects in such granules which limit their possible uses, included in these defects being the lack of strength of color and proper tone of color, inadequate weathering properties, and the limiting of the range of colors available to be produced. Furthermore, these methods known to me are not capable of being carried out at a reasonable cost.

The principal objects and advantages of this invention reside in the provision of an improved article of manufacture, glaze coated granules, particularly of the colored type, which may be manufactured with a wide range of colors of extreme permanence; the provision of treated granules of the character referred to in which a good bonding action can be attained between the finished granulated material and other bonding materials; the provision of an improved granulated material to be employed as a weather coating on various objects which possesses a permanence of color not heretofore attained by the methods and in the articles known to me, and the provision of glazed granules in which I may be enabled to obtain certain desired color effects and to accomplish this purpose at a cost less than any of the prior methods known to me.

The present invention has as further objects the provision of an improved granulated finished article having a glaze which is permanent in its adherence to the granule, has the property of desired viscosity to facilitate manufacture, has a reactivity toward the base granule which helps in attaining the desired permanence of glaze and/or color; and the provision in such a granulated material of a glaze having an affinity for and an ability to carry color in the necessary strength, and at the same time to possess suitable coefficients of expansion and contraction so that the glaze may be successfully employed on a wide range of different materials employed as the base granule.

This invention also has as one of its objects the provision of an improved method of preparing the improved glaze and applying the same to the granulated material to produce the colored granule and which will produce colored aggregates having high permanence of color and to accomplish this at a relatively low cost; the provision of an improved method of manufacturing colored granulated material in which the intensity of color may be regulated to a desired degree and to such an extent that the color and/or the glaze are not undesirably affected by any quantity of substance such as a fluxing agent employed for enhancing the reaction between the glaze and the granule to which it is applied; and the provision of an improved method of manufacturing colored granular material in which the glazing effect of the coating applied to the individual granules is enhanced, even with the presence of a deep color in the glaze.

I have found that my improved methods of coating granulated material permits of the production of colored aggregates wherein the glaze applied to the individual granules is one containing a pigment, and is substantially opaque, without, however, producing a dulling of the glaze, thus overcoming one of the principal disadvantages of the prior colored granulated material heretofore produced either by artificial methods or that found in natural deposits.

For the purpose of my invention, I have preferred to employ quartzite granules, inasmuch as quartzite is metamorphosed sand stone in which quartz particles are cemented with a silicious cement, sometimes, but not always, containing calcium carbonate and iron oxide. The porosity of quartzite is relatively low, due to the fact that the only possible porosity of quartzite is produced by the intervening portions of cement between the quartz grains, which is a relatively small part of the granule itself. Quartzite appears to possess a further characteristic of having an affinity for the glaze as applied thereto and particularly the quartzite granule appears to react on its outer surface with the glaze coating so that the coating is knitted firmly to the granule by the heat treatment which will be hereinafter described.

I am not prepared to state just what is the exact reaction between the improved glaze and the preferred granulated material quartzite, but it appears that quartzite is partially dissolved by the molten glaze coating and reacts chemically with materials of the glaze by furnishing the silica to form complex silicates, these silicates and other compounds being mutually soluble, at least to a great extent. It may be and undoubtedly is true that part of the material, such as in some instances color, is inert to the glaze.

One method of producing quartzite granules may include the steps of employing a glazing material in a powdered form ground in an oil grinding liquid such as fish oil, varnish makers' gloss oil or the like, this powdered glaze containing the desired color.

It is now appropriate to point out that the proportion of color to glazing material may be at the outset controlled, and, for my purposes, I prefer to add a quantity of pigment to the mass of glaze to such an extent that the glaze has proper flowing properties, and the desired color is obtained in a single step. The proportions of pigment to th mass of glaze are controlled to an extent short of that amount which would dull the glaze when in a finished condition. To illustrate this feature of my invention it may be made clear that, in mixing common paints, it is possible to add so much pigment to the vehicle that, instead of leaving a glossy appearance when dry, as in the case of some unbaked enamels when dry, that the finished paint, when applied to a surface is dull. This is due to an excess of pigment beyond the desired and proper amount, and, in my present invention, I add to the glaze and oil vehicle, either before the glaze is mixed with the oil or afterwards, such amount of pigment as will produce in the finished article a deep color having a glossy surface appearance.

Where a gloss to the finished granule is not desirable, I add a "matting" compound to reduce the gloss. This compound does not rob the bond of life as increasing the pigment content does to paint.

I prefer to use a gloss oil consisting of rosin dissolved in mineral spirits, as a vehicle for suspending and distributing the glaze, inasmuch as this is a low-cost deposit in a form adhering tenaciously to the surface of the quartzite granule. This vehicle, of course, is burned off and forms no permanent part of the finished fused glaze.

The glaze mixture, including the finely divided glaze and the oil vehicle in which it is suspended and the mineral granules, are charged into a mixer such as that commonly used for mixing concrete either separately or together. This batch is then mixed until the glaze suspension is distributed uniformly over the surfaces of the granules.

The thus coated granules are then removed from the mixer and charged in a furnace which may be either of the batch type, that is, one in which each batch is introduced, heat treated, and then removed, or may be of the continuous type rotary furnace, or may be a kiln or furnace in which no agitation takes place. A further alternative may be to leave the batch in the first mixer and apply gas or oil heat thereto, as desired.

In the firing step the oil burns off, leaving the glaze in a uniform coating over the surface of the quartz granules and, upon continuing the firing, the glaze melts down to a substantially continuous film covering the individual granules, this coating being fused to the surface of the granule and the heat being applied to a degree sufficient to produce a physical and/or chemical reaction between the glaze and the surface of the granule but not to such an extent as to render the granule itself molten.

The period of time which the object is fired will depend on the kind of base granule employed, and the time is so arranged that the material comes out of the kiln or rotary furnace in a granular condition and needs no further crushing.

The glaze or vitreous enamel which I may employ in this process may be of the raw type, or may be a mixture of the desired components previously fused together and ground, which latter is known as a fritted glaze. In the case of the fritted glaze the color pigment may be added either in the fused mixture or in the subsequent operation in oil.

One formula which I disclose as an example may be as follows for manufacturing green roofing granules:

| | Parts by weight |
|---|---|
| Feldspar | 30 |
| Borax | 32 |
| Red lead | 25 |
| Sodium nitrate | 6 |
| Whiting | 13 |
| Chromium oxide | 14 |
| Cobalt oxide | 1 |

In some instances it may be desired to increase the amount of chromium oxide in the above formula, but the foregoing formula has served to produce a satisfactory color glaze.

This glazing material in an oil vehicle when mixed with the granules to be coated and fired in a rotary furnace, may be subjected to a temperature of approximately 1600° F. At first, when the batch is introduced into the kiln the oil bond in which the glaze is suspended is burned off, and, at the end of this burning process, the glaze begins to fuse. The color having been previously evenly distributed in the glaze, upon the completion of the fusing, a smooth even coating is accomplished, both as to glaze coating and color intensity. The temperature may then be increased slightly beyond the fusing temperature of the glaze and maintained for a predetermined time, which insures an even coating and the desired extent of physical and/or chemical reaction between the base granule and the glaze. Either oxidizing or reducing conditions may be maintained as occasion demands, by control of the firing step of the process, particularly if oil or gas are used, thus insuring good bonding and permanence of the coating and color. With the method described herein, I find that I am enabled to produce a color glaze having a desired strength, and variability of color in different degrees as desired, and a permanence of color not heretofore accomplished by any of the methods known to me.

The raw glaze heretofore referred to and one which permits of considerable reduction in the cost of manufacture is one in which the raw materials are not melted together and subsequently ground, but in which these materials are added as separate products mixed physically and ground together.

*Raw glaze formula*

| | Parts by weight |
|---|---|
| Borax | 30 |
| Whiting | 12 |
| Silica fines | 20 |
| Chrome oxide | 7 |
| Sodium dichromate | 14 |

An alternative formula is as follows:

| | Parts by weight |
|---|---|
| Borax | 32 |
| Zinc oxide | 9 |
| Silica | 20 |
| Chrome oxide | 7 |
| Sodium dichromate | 14 |

Reverting to the formula set out herein for manufacturing green roofing granules, I wish to point out that I have varied the percentage of green pigment, namely, chromium oxide, and produced the intensity of color hereinbefore referred to, which I consider to be new in this art. The approximate percentage of chromium oxide to the glaze is preferably 16⅔% where the color content of previous conventional glazes known to me is not in excess of 10%, usually much less. For this reason, my finished article is thus possessed of the characteristic of a more intense, and, therefore, more lasting color and, further, that if, in the manufacture of the colored granules, some chemical reaction takes place which would tend to affect the tone or depth of the coloring, the added quantity of pigment will offset such tendency to affect the ultimate color and prevent injurious effects in the finished color coating.

An example of a formula for this purpose may be as follows:

| | |
|---|---|
| Red lead | 70 |
| Borax | 45 |
| Silica | 25 |
| Chromium oxide | 26 |

From the foregoing it will be observed, therefore, that the new article of manufacture which I produce, that is to say, a colored granulated mineral material, has the characteristics of having each of the individual grains substantially completely coated with a fused glaze in which a pigment is contained in such proportion to the mass of glaze that the desired color is obtained in a single step with a low glaze cost due to the high percentage of color pigment. The glaze coating possesses the necessary physical properties to be highly weatherproof. The higher weathering properties of the colored or ceramic coating of this invention are due to an important degree to the relative proportions of certain materials, as illustrated by the coating compositions or formulae given hereinabove. A mol ratio of tri-valent insolubilizing material, e. g. boric oxide (from borates such as borax or other boric oxide containing compound) or the like, to mono-valent and di-valent reactant metal oxides, e. g. sodium oxide (soda) (from sodium dichromate, sodium nitrate, etc.), zinc oxide, calcium oxide (from whiting) etc., of the order of that illustrated in the formulae hereinabove presented, is advantageous and important. By the employment of quartzite as the preferred base granule, I find there is less tendency of the base granule physically or chemically reacting to an extent sufficient to injuriously affect the color of the finished coating. This is of considerable importance, inasmuch as it has been found that with some materials employed as the base granule, when subjected to high temperatures necessary to fuse the glaze thereon, the base granule supplies material to react with the glaze coating which has a disastrous effect on the final color, i. e., if the base granule contain a higher percentage of manganese it will be almost impossible to add enough chrome oxide to the glaze to arrive at a desirable green granule. These undesirable features are eliminated by my invention.

Where tri-valent insolubilizing material is expressed as the oxide, such as the boric oxide ($B_2O_3$) of borax or other borate compound and where the combined mono-valent and di-valent reactants are expressed as metal oxide equivalents, all being expressed on a mol basis, it will be observed that there is a ratio of tri-valent metal oxide to combined mono-valent and/or di-valent metal oxides in each of the illustrative coating compositions hereinabove given, as follows: In the first formula given hereinabove, the ratio is approximately 0.540; in the second formula of this specification the ratio is approximately 0.638; in the third formula hereof, the ratio is approximately 0.69; while in the last formula given hereinabove, the ratio is approximately 0.557. The third formula given in the specification, as just stated, has a mol ratio of tri-valent metal oxide to combined mono-valent and/or di-valent metal oxide of approximately 0.69. As exemplified by the other illustrative coating compositions hereinabove, the mol ratio of tri-valent metal oxide to combined mono-valent and/or di-valent metal oxide is usually appreciably less than 0.69 and as illustrated by two of the three formulae, a ratio of less than 0.6, e. g. of the order of 0.55 or less, is advantageous.

On the other hand, it will be obvious that the $B_2O_3$ bearing material, or equivalent tri-valent insolubilizing agent or amphoteric metal oxide should be present in substantial mol proportion in relation to the lower valent metal oxide or alkaline oxide components. Since borates, e. g. borax, help to produce a fluid coating at relatively low temperatures and provide other advantages, as well as serving to insolubilize monovalent and di-valent metal oxide bearing compounds, as will be evident from the illustrations, the borate (or equivalent) employed should be present in substantial proportion; that is, it will be evident that the mol ratio of tri-valent metal oxide to the lower valent metal oxide components should not be zero, but rather substantially greater than zero.

Thus it will be seen that an important element of the finished coating or glaze of the present invention may be a borate or especially a borosilicate of such alkaline or alkaline earth metals as calcium (present in whiting), lead, zinc, alkali metals such as $Na_2O$ (supplied by sodium nitrate, sodium dichromate, etc.), and $K_2O$ (supplied by feldspar, for example). Silica is, of course, also a highly useful ingredient in my coating composition and is normally present in substantial proportions so that the coating composition may comprise borosilicates of zinc, lead, or alkaline earth metals such as calcium, and/or of alkali metals, e. g. potassium and sodium, as illustrated. Where aluminum or alumina ($Al_2O_3$) is present in the coating ingredients, as where feldspars, etc., are employed, the finished coating may comprise (e. g. in addition to borates and/or boro-silicates) alumino-silicates (and some aluminates) of such metals as zinc, lead, calcium, magnesium, etc. and/or of sodium, potassium, and the like.

In the foregoing I have described one of the processes for producing a green glaze mineral material, and the steps of this process are, first, the step of mixing the glaze with oil to form a paste, the second step to coat quartz or quartzite or other mineral substance mentioned with this paste by mixing in a concrete mixer, and the third step to charge the mixture into a furnace and fire by the batch process, with or without agitation. An alternative, as hereinbefore pointed out, may be to agitate the mixture during the heating and fusing step, if desired. In this process a good distribution of glaze and color is obtained in the preliminary mix, that is, in the first step; agitation is not essential to the production of a good coating by the step of heating; and, furthermore, a relatively short process time may be required where a fritted glaze is employed so that the glaze needs only to be melted down in situ and no additional time is needed for coating and maturing it.

I now will proceed to describe several alternative methods for manufacturing colored coated mineral material, one of which processes is as follows:

The glaze employed in this process is conveniently a fritted lead glaze, and the process may be of a continuous nature.

The steps are to wet the mineral, such as quartz or quartzite, in a mixer with a small amount of sodium silicate solution, and, when thoroughly mixed, the dry powdered glaze is introduced. This causes the powdered glaze to adhere to the sodium silicate, and the mixture thus produced of glaze and silicate immediately sets to a hard, dry, adherent film on the surface of the mineral. This mixture is then fed continuously into a rotary furnace and the heat applied to the mixture of glaze quartzite and sodium silicate reduces the glaze to a molten state, thus eventually coating the individual granules with an even coating.

This method has the attendant advantages of economy of the continuous operation, and the fact that sodium silicate when mixed in the proper proportions with the fritted glaze sets to a relatively hard cement, and the quartz, when coated with this cement film, is a free flowing mass which handles nicely in the screw feeder and will flow freely through a feed pipe. Although the sodium silicate glaze film is not uniform enough to produce a uniform and as desirable a coating, when fired, without the step of agitation during firing, the bonding of the glaze granule is an aid to producing a fixed and even coating. Furthermore, this process cuts down the hazard due to dust in the mixture.

A further alternative method is to employ raw glaze in a continuous process together with sodium silicate, and the steps are as follows:

First the raw glaze is made up by mixing together the various powdered raw materials in a concrete mixer with a charge of iron balls or in a ball mill. From this point on, the procedure is to mix the granular material with a small amount of sodium silicate solution for wetting the same. When thoroughly mixed, the glaze is added and adheres to the sodium silicate and immediately sets to a hard, dry, adherent film on the surface of the quartz. It must be kept in mind that the quartz is wet by the sodium silicate solution, and the glaze is added and the mixing is continued until the glaze is uniformly distributed over the quartz. This mixture is then fed continuously into a rotary furnace and heated in a manner sufficient to cause the glaze to melt and flow in each instance on each quartzite granule and form a uniform coating thereon.

It will be understood that in this method the amount of sodium silicate solution is not enough to be considered as a material part of the glaze, and its major purpose is to settle or control dust thrown off by the granule charge.

The advantages of the last mentioned method are that the raw glaze is a low cost material and that a good relatively dry mix is obtained which handles easily in a screw feeder. The sodium silicate cements the glaze to the granules in such a way as to prevent ring formation due to dust in the furnace, and the process has the advantage of economy in operation.

By the ring formation referred to is meant the depositing of dust particles of glaze in the early stages of firing, which eventually chokes up the opening in the furnace almost completely. Reference is made to this elsewhere in this description.

A further alternative method of coating the granule involves the employment of a raw glaze containing sodium dichromate in which the process is a continuous wet process. I find that this process is generally applicable to production of the green colored granule only.

The steps of the process are as follows:

The raw glaze is made up by mixing together the materials such as set out in the raw glaze formula appearing elsewhere in this description, and sodium dichromate is used as one of the ingredients. The quartz or quartzite granules are wetted with water in a concrete mixer or the like, and the dry powdered glaze is added thereto until the mass is homogeneous. The thus coated quartzite granules are then fed continuously into a rotary furnace and heat is applied for fusing the glazing material on to the individual granules.

The advantages of this method are that the sodium dichromate melting at a low temperature (325° C.) acts as a vehicle to bond the glaze constituents to the granule and help their spreading in the early stages of the process, and, as a result, better coating is obtained. Sodium dichromate can be substituted to take the place of at least 50% of the chrome oxide used for producing the color, and thus reduces the cost of the coloring agent, and, if handled carefully and properly, will produce a better color development than the chrome oxide. Owing to the wet mixing, a minimum amount of dust is thrown off and thus the hazard from this standpoint is minimized. This method develops ring formation in the furnace, but this ring formation can be materially reduced by putting sufficient water in the mix.

A still further alternative form of the method described herein may be termed a continuous wet mix and is generally applicable to green colors only. The raw glaze contains no sodium dichromate in this instance, but the sodium dichromate is dissolved in water and then the quartz is wetted with dichromate solution.

The steps are as follows:

A raw glaze mixture is made up; sodium dichromate is then dissolved in water. The quartzite is then, in a mixer, wetted with the dichromate solution. Thereupon the glaze is added to the wet quartz, and the entire mass mixed until homogeneous. Subsequently and continuously with the mixing, the homogeneous mass of quartzite granules and glaze are fed continuously into the rotary furnace and, while agitating the mass, heat is applied for fusing the glaze mixture on to the individual granules.

This sodium dichromate minimizes the dichromate dust hazard and by the mixing of the dichromate in water gives a good dispersion of the dichromate and thus a more even coating. The glaze mix does not cake, and, at the same time, a better coating is obtained and the cost of the product is reduced by virtue of the fact that the sodium dichromate is substituted for at least 50% of the chrome oxide used as the color producing medium.

The function of agitation as applied to the foregoing process is that a better spreading of the molten glaze over the surface of the quartzite granules is accomplished by agitation, and, in the case where raw glazes are employed, the agitation serves as a means for thoroughly homogenizing the glaze film itself. Furthermore, heat transfer is facilitated during the agitation step.

While in some of the processes described herein the quartz and glaze are subjected to a premixing before feeding into the furnace, and in some instances a vehicle such as the water or sodium silicate are employed for this purpose, I find that in most instances this pre-mixing is not sufficient to give a good glaze coating without the subsequent agitation during the firing process. I find that samples of the mineral which have been mixed with glaze in the premixing operation and have then been fired without agitation are inferior to those which have been fired during agitation.

I have found that in the actual production of the coated granule it is desirable to obtain a greater degree of agitation than that ordinarily obtained in a rotary furnace, and I find it desirable to rotate the furnace at a higher rate of speed than formerly normally used. I have also found that there are lower limits of speed of rotation of the furnace which, if the speed is reduced beyond these lower limits, produces an unsatisfactory coating.

I find that for my present purposes the limit of speed of rotation lies at a point between 1 and 2 R. P. M. Of course, this rate of speed is purely arbitrary, as with different types and sizes of furnaces the speed of rotation will have to be governed as best suited to the particular batch to be produced.

The base for the raw glaze as disclosed herein consists of a mixture of borax, whiting, and quartz fines, and, of course, it will be understood that the composition of this base may be varied considerably. To the above base may be added any of the commonly known ceramic coloring agents such as chromium oxide, for green, cobalt oxide for blue, iron oxide for red, etc. For green, as hereinabove pointed out, I prefer to replace part of the chromium oxide by sodium dichromate, inasmuch as the latter is lower cost and has the processing advantages already pointed out. Sodium dichromate melts at about 320° C., and the molten salt acts as a bond to hold the glaze constituents to the granule during the preliminary stages of firing before the glaze proper becomes molten, and this is particularly important in a raw glaze containing borax, for the reason that borax tends to puff up or intumesce upon heating. This intumescence is very light and powdery and much of it is blown out of the furnace and lost. Sodium dichromate performs the function of preventing this intumescence and makes for a better coated product. There are other materials such as sodium nitrate, potassium nitrate, and barium hydrate having this desirable property, that is, preventing intumescence and which are applicable to colors other than green. When the glaze tends to powder off in the early stages of firing, there is a tendency for a deposit to build up on the walls of the furnace which, if not controlled within desirable limits, will eventually choke up the opening, and hamper the free flow of the material through the furnace. This is what I have termed ring formation, and I find that the use of the materials sodium dichromate, sodium nitrate, etc., hereinabove mentioned, reduces the ring formation.

I desire to point out that the use of water in the preliminary mixing, while not absolutely essential, has the advantages of (1) minimizing the dust hazard during the mixing operation; (2) causing the glaze constituents to adhere slightly to the granules, thus preventing separation of the glaze from the quartz in the feeding equipment; (3) the water in the mix helps to minimize the formation of deposits in the furnace; and (4) when sodium dichromate is used in the mix, this is most easily handled as a water solution.

I find it convenient in using water not to make up a slurry of the glaze constituents and water as some of the prior processes known to me now do, but rather to add them separately to the mixer. This is done in all cases except where sodium dichromate is dissolved in the water, and I also desire to point out that in most cases I do not employ enough water to make an actual slurry of thin enough consistency to spread on the granules in a mixer.

While a satisfactory coated product may result by allowing the granules to be subjected to the furnace treatment for about 30 minutes, I have found that it is advantageous to allow the granules to be subjected to heat for a period of ninety minutes or more, and that the advantages gained thereby are that the finished product has better weathering properties, and better control of the color is attained and a greater economy in degree of heat necessary to be employed.

I desire to point out that the employment of sodium dichromate, a low fusing salt, and sodium nitrate, potassium nitrate and other salts of similar properties in the firing process permits the functioning of these elements as a bonding or spreading agent in the preliminary stages of firing. The glaze itself begins to melt in the range of 600° to 700° C. The low fusing salts melt at 300 to 400° C. or even lower if water is present, and act as a vehicle for the rest of the glaze constituents, carrying them to the granules and facilitating their adherence, at the same time preventing their loss through the agitation of the furnace until these constituents become hot enough to melt and thus remain on the granule.

I thus definitely divide the firing of the product into substantially two stages, that is to say, (1) the interval from the charging of the furnace to the time at which the glaze fuses; and (2) the interval from the time of fusing of the glaze to the time of discharge of the completely coated product. It appears, therefore, that the function of the low melting salts referred to applies only in the first stage of heating. However, agitation of the mass in the furnace applies to both stages of heating, the latter heating stage being termed the maturing stage of the glaze.

From the foregoing I find that the time in the maturing stage is a definitely measurable factor which affects the quality of the material. I have found that this time may range from ten to fifty minutes. For a fritted glaze ten minutes is sufficient to produce a good weathering product. For raw glaze we find that a greater time is desirable, though not absolutely necessary, with a limit which I have found to be desirably fixed at fifty minutes. The temperature at the end of the maturing time is, of course, at or above the fusing point of the glaze.

The foregoing described granulated material with a colored glaze thereon, after cooling, preferably accomplished by an accelerated means, such, for example, as an air blast, may then be applied to a sheet containing on one surface thereof a bituminuous adhesive coating, the granulated material then being pressed into this coating and permanently thus applied to the weather side of the sheet to form roofing shingles and the like.

Having thus described my invention and illustrated its use, what I claim as new and desire to secure by Letters Patent is:

1. In the process of producing colored granular material by affixing to a base granule a stable, substantially permanent color-bearing inorganic bond, the steps which include homogenizing glaze forming materials and a color bearing material upon the surfaces of the base granule by inter-granular contact of the base granules during the mixing under heat treatment in the presence of an adhesive vehicle of a low melting material, to form a smooth paste of plastic character tenaciously adhering to the base granule and continuing the mixing to provide a uniform coating of said homogenized paste, and then continuing the heating and mixing to fuse the glaze materials upon the base granule.

2. Colored, surface-coated, glazed granules comprising refractory base granules having thin, colored weather-resisting surface coatings thereon produced in accordance with the process claimed in claim 1.

3. A process of producing colored granular material by affixing thereto a stable substantially permanent color-bearing inorganic bond which includes the steps of grinding to a finely divided form a color-bearing bond containing as ingredients thereof a flux, metallic oxide, and a cementitious low-melting adhesive vehicle to form a smooth paste of plastic character tenaciously adherent to the granular material, mixing the paste with the granular material in predetermined proportions until a substantially uniform coating of said paste is applied to each granule by inter-granular contact during mixing, then introducing the coated granules into a kiln and applying heat at a temperature sufficient to activate the vehicle into adhesiveness and fuse the bond to a substantially fluid condition, producing chemical inter-action between the bond and the granule, and then cooling the mass to produce a predetermined toughness in the finished material.

4. Colored, surface-coated, glazed granules made in accordance with the process claimed in claim 3.

5. The process of producing glazed roofing granules or the like which includes as steps thereof forming a glaze dispersion of a powder and a substantially non-aqueous plastic vehicle to form a paste of plastic character, mixing the paste and a quantity of granulated material for coating the individual granules with paste by an inter-grinding action of the granules and paste, burning off the vehicle if necessary, then heating the mixture to cause the coating to adhere to the granules.

6. A new article of manufacture, a roofing sheeted material including a backing, having a coating of granulated material, made according to the process of claim 5.

7. The process of producing glazed roofing granules or the like which includes as steps thereof forming a glaze suspension of a powder and an oil to form a paste, mixing the paste and a quantity of granulated material in a state of plasticity of the paste retaining the glaze in suspension for coating the individual granules with paste and distributing the suspended particles during agitation, burning off the oil, then heating the mixture to cause the coating to fuse to the granules.

8. The process of producing glazed roofing granules of the like which includes as steps thereof forming a glaze dispersion of a powder, a pigment, and an oil to form a paste, mixing the paste and a quantity of granulated material in a state of plasticity of the paste retaining the glaze in suspension for coating the individual granules with paste and distributing the suspended particles during agitation, burning off the oil, then heating the mixture to cause the coating to adhere to the granules.

9. The process of producing glazed roofing granules or the like which includes as steps thereof forming a glaze dispersion of a powder and an oil to form a paste of sufficient plasticity for coating and responsive to agitation without separation of the glaze, mixing the paste and a quantity of granulated material for coating the individual granules with paste and agitating to distribute the paste on the individual particles, burning off the oil, then heating the mixture while agitating the same to cause the coating to adhere to the granules.

10. The process of producing glazed roofing granules or the like which includes as steps thereof forming a glaze dispersion of a powder and an oil by grinding to form a paste in a state of plasticity and stable to agitation, mixing the paste and a quantity of granulated material for coating the individual granules with paste, burning off the oil, then heating the mixture to cause the coating to adhere to the granules.

11. The process of producing glazed roofing granules or the like which includes as steps thereof forming a glaze dispersion of a powder and an oil to form a paste, mixing the paste in a state of plasticity of the paste retaining the glaze in suspension and a quantity of granulated quartzite for coating the individual granules with paste, burning off the oil, then heating the mixture to cause the coating to adhere to the granules.

12. The process of producing glazed granular roofing material or the like which includes as steps thereof forming a paste of plastic character by mixing oil and glaze in powdered state, then agitating the paste and a quantity of refractory granular material together, to coat the granules by an intergrinding action of the granules and paste, and then introducing the thus coated granules into a zone of heat sufficient to burn the oil out of the mixture and render the base glaze molten and cause it to react with the superficies of the individual granules.

13. The process of producing glazed granular roofing material or the like which includes as steps thereof forming a paste of appreciable plasticity by mixing an oil and glaze in powdered state, then agitating the paste and a quantity of refractory granular material together, to coat the granules by an intergrinding action of the granules and paste, burning off the oil, and then subjecting the mass to a temperature of approximately 1600° Fahrenheit to render the glaze molten and cause it to react with the surface of the individual granules.

14. A process of producing colored granular roofing material or the like by affixing thereto a stable permanent color-bearing inorganic bond which includes the steps of grinding a powdered color-bearing bond in a non-aqueous vehicle to a smooth paste of plastic character; mixing the paste with the granular material in predetermined proportions until a smooth coating of said paste is applied to each granule by an inter-grinding action of the granules and paste; then introducing the coated granules into a kiln and applying heat at a temperature sufficient to burn off the organic medium or vehicle and fuse the bond to a fluid condition, producing chemical reaction between the bond and the granule, and then cooling the mass to produce a pre-determined toughness in the finished material.

15. A process of producing colored granular roofing material or the like by affixing thereto a stable permanent color-bearing inorganic bond which includes the steps of grinding a powdered color-bearing bond in an oily vehicle to a smooth paste of plastic character; mixing the paste with the granular material in pre-determined proportions until a smooth coating of said paste is applied to each granule by an inter-grinding action of the granules and paste; then introducing the coated granules into a kiln and applying heat at a temperature sufficient to burn off the organic medium or vehicle and fuse the bond to a fluid condition, producing chemical reaction between the bond and the granule, and then cooling the mass to produce a predetermined toughness in the finished material.

16. A process of producing colored granular roofing material or the like by affixing thereto a stable permanent color-bearing inorganic bond which includes the steps of grinding a powdered color-bearing bond containing as ingredients thereof feldspar, borax, red lead, sodium nitrate, whiting, color producing oxides in a non-aqueous vehicle to a smooth paste of plastic character in which the ingredients are uniformly suspended; mixing the paste with the granular material in predetermined proportions until a smooth coating of said paste is applied to each granule by an inter-grinding action of the granules and paste; then introducing the coated granules into a kiln and applying heat at a temperature sufficient to burn off the organic medium or vehicle and fuse the bond to a fluid condition, producing chemical reaction between the bond and the granule, and then cooling the mass to produce a predetermined toughness in the finished material.

17. A process of producing colored granular material by affixing thereto a stable permanent color-bearing inorganic bond which includes the steps of grinding a powdered color-bearing bond containing as ingredients thereof feldspar, borax, red lead, sodium nitrate, whiting, chromium oxide and cobalt oxide in a fish oil vehicle to a smooth paste; mixing the paste with the granular material in predetermined proportions until a smooth coating of said paste is applied to each granule; then introducing the coated granules into a kiln and applying heat at a temperature sufficient to burn off the organic medium or vehicle and fuse the bond to a fluid condition, producing chemical reaction between the bond and the granule, and then cooling the mass to produce a predetermined toughness in the finished material.

18. The process of producing glazed granules which includes as steps thereof forming a glaze suspension of a powder and an oil to form a paste, mixing the paste and a quantity of granulated material for coating the individual granules with paste, then heating the mixture to cause the coating to fuse to the granules.

19. The process of producing glazed granules which includes as steps thereof forming a glaze dispersion of a powder, a pigment, and an oil to form a paste, mixing the paste and a quantity of granulated material for coating the individual granules with paste, then heating the mixture to cause the coating to adhere to the granules.

20. The process of producing glazed granules which includes as steps thereof forming a glaze dispersion of a powder and an oil to form a paste, mixing the paste and a quantity of granulated material for coating the individual granules with paste, then heating the mixture while agitating the same to cause the coating to adhere to the granules.

21. The process of producing glazed granules which includes as steps thereof forming a glaze dispersion of a powder and an oil by grinding to form a paste, mixing the paste and a quantity of granulated material for coating the individual granules with paste, then heating the mixture to cause the coating to adhere to the granules.

22. The process of producing glazed granules which includes as steps thereof forming a glaze dispersion of a powder and an oil to form a paste of plastic character tenaciously adherent to quartzitic granules, mixing the paste and a quantity of granulated quartzite for coating the individual granules with paste by inter-granular grinding for distributing the paste, then heating the mixture to cause the coating to adhere to the granules.

23. The process of producing glazed granules which includes as steps thereof forming a glaze suspension of a powder and an oil to form a paste of plastic character tenaciously adherent to quartzitic granules, mixing the paste and a quantity of granulated material for coating the individual granules with paste by inter-granular grinding for distributing the paste, then heating the mixture to burn off the oil and to render the coating molten to an extent sufficient to produce a superficial reaction between the coating material and the exposed surface of the granule.

24. The process of producing glazed granules which includes as steps thereof forming a glazed coating material of a powder and a glucose solution to form a paste in a state of plasticity of the paste retaining the glaze in suspension, mixing the paste and a quantity of granulated material for coating the individual granules with paste, burning off the glucose, and then heating the mixture.

25. The process of producing glazed granules which includes as steps thereof forming a glazed coating material of a powder and a glucose solution to form a paste of plastic character tenaciously adherent to quartzitic granules, mixing the paste and a quantity of granulated material for coating the individual granules with paste by inter-granular grinding for distributing the paste, and then heating the mixture.

26. The process of producing glazed granular material which includes as steps thereof moistening the granular material with a sodium silicate solution; adding thereto a dry powdered glazing material so as to cause the same to adhere to the sodium silicate and then setting the silicate and coating to form a relatively hard, dry, adherent film on the surface of the granulated material rendering the granules free flowing; and then feeding said coated material into a furnace and subjecting the same to heat.

27. The process of producing glazed granular material which includes as steps thereof coating a quantity of granular mineral material with a solution of sodium silicate, causing the sodium silicate solution to set to a relatively dry, hard, adherent film by thoroughly mixing the same with said mineral material rendering the mineral matter free flowing and adding thereto a dry powdered glaze which co-operates with the sodium silicate to set on the surface of the mineral, and then subjecting the mineral to temperature sufficient to fuse the glaze thereon.

28. The process of producing glazed granular material which includes as steps thereof forming a raw glaze material by mixing together a fluxing agent, silica, and a coloring pigment, then coating a quantity of granulated mineral material with a solution of sodium silicate and adding the raw glaze thereto to uniformly coat the individual granules, then setting the granules to a free flowing condition, and then subjecting the mass to heat sufficient to fuse the glaze on to the individual granules.

29. The process of producing glazed granular material which includes as steps thereof mixing powdered raw materials including a fluxing agent, a coloring agent, silica and sodium dichromate to form a glaze paste, subjecting a quantity of granulated mineral material to treatment with a sodium silicate solution and adding the glaze thereto until uniformly distributed on the mineral, setting the silicate to a free flowing condition of the granules, and then subjecting the mass to heat sufficient to fuse the glaze on to the individual granules.

30. The process of producing glazed granular material which includes as steps thereof moistening the granular material with a sodium silicate solution; adding thereto a dry powdered glazing material so as to cause the same to adhere to the sodium silicate and setting the silicate to form a relatively hard, dry, adherent film on the surface of the granulated material, and then feeding said coated material into a furnace and subjecting the same to heat and agitation for fusing and distributing a glaze as a coating on the individual granules.

31. The process of producing glazed granular material which includes as steps thereof forming a raw glaze material by mixing together a fluxing agent, silica, and a coloring agent, then coating a quantity of granulated mineral material with a solution of sodium silicate and adding the raw glaze thereto to uniformly coat the individual granules, setting the silicate coating, and then subjecting the mass to heat sufficient to fuse the glaze on to the individual granules and agitation for fusing and distributing a glaze as a coating on the individual granules.

32. The process of producing glazed granular material which includes as steps thereof mixing powdered raw materials including a fluxing agent, a coloring agent, silica and sodium dichromate to form a glazed paste, subjecting a quantity of granulated mineral material to treatment with a sodium silicate solution and adding the glaze thereto until uniformly distributed on the mineral, setting the silicate to provide a free flowing condition of the granules, and then subjecting the mass to heat sufficient to fuse the glaze on to the individual granules and to agitation for fusing and distributing a glaze as a coating on the individual granules.

33. The process of producing glazed granular material which includes as steps thereof mixing powdered raw materials in such proportions as to afford neutral, basic and acidic oxides and a coloring agent to form a glazing paste, subjecting a quantity of granulated mineral material to treatment with a sodium silicate solution, and adding the glaze thereto until uniformly distributed on the mineral and setting the granules so treated to a free flowing condition, and then subjecting the mass to heat at a temperature sufficient to fuse the glaze onto the individual granules.

34. The process of producing glazed granular material which includes as steps thereof mixing powdered raw materials in such proportions as to afford neutral, basic and acidic oxides and a coloring agent to form a glazing paste, subjecting a quantity of granulated mineral material to treatment with a sodium silicate solution, and adding the glaze thereto until uniformly distributed on the mineral and setting the granules so treated to a free flowing condition, and then subjecting the mass to heat at a temperature sufficient to fuse the glaze onto the individual granules, and subjecting the mass to agitation.

35. The process of producing glazed granules which includes as steps thereof forming a coating material of a suspension of a powder and a combustible vehicle to produce a paste tenaciously adherent by inter-granule rubbing, mixing the paste and a quantity of granulated material for coating the individual granules with the paste by inter-granular contact during agitation thereof, burning off the combustible vehicle and then heating the mixture to cause the coating to fuse in an insoluble layer of the individual granules.

36. The process of producing glazed granular material which includes as steps thereof first forming a coating material of a suspension of a glazing material in powdered form and a combustible temporary binding agent to form a paste tenaciously adherent by inter-granular rubbing, mixing the paste and a quantity of granular material so as to coat the individual surfaces thereof with a film of said paste, then subjecting the thus coated granules to heat at a temperature sufficient to burn off the combustible temporary binding agent, and then increasing the heat applied to the thus coated granules to cause the coating to fuse in an insoluble layer on the individual surfaces of said granules.

37. A process of producing colored granular material by affixing thereto a stable substantially permanent color-bearing inorganic bond which includes the steps of grinding to a finely divided form a color-bearing bond containing as ingredients thereof a flux, metallic oxide, and organic vehicle to form a smooth paste of plastic character tenaciously adherent to the granular material; mixing the paste with the granular material in predetermined proportions until a substantially uniform coating of said paste is applied to each granule by inter-granular contact; then introducing the coated granules into a kiln and applying heat at a temperature sufficient to burn off the organic vehicle and fuse the bond to a substantially fluid condition, producing chemical reaction between the bond and the granule, and then cooling the mass to produce a predetermined toughness in the finished material.

GEORGE W. SWENSON.